(12) United States Patent
Hurst

(10) Patent No.: US 8,155,706 B1
(45) Date of Patent: Apr. 10, 2012

(54) SCENT NOTIFICATION SYSTEM FOR A PORTABLE COMMUNICATION DEVICE

(76) Inventor: David Hurst, Desert Springs, AZ (US)

( * ) Notice: Subject to any disclaimer, the term of this patent is extended or adjusted under 35 U.S.C. 154(b) by 262 days.

(21) Appl. No.: 12/643,488

(22) Filed: Dec. 21, 2009

(51) Int. Cl.
*H04M 1/00* (2006.01)
*H04B 1/38* (2006.01)
*B67D 1/00* (2006.01)
*B67D 7/14* (2010.01)
*B65D 88/54* (2006.01)
*G01F 11/00* (2006.01)

(52) U.S. Cl. ........ 455/567; 222/52; 222/325; 455/556.1; 455/575.1

(58) Field of Classification Search ............ 455/567, 455/575.1, 556.1; 222/52, 325
See application file for complete search history.

(56) References Cited

U.S. PATENT DOCUMENTS

| | | | |
|---|---|---|---|
| 7,512,415 B2 * | 3/2009 | Fazzio et al. | 455/556.1 |
| 2004/0204043 A1 * | 10/2004 | Wang et al. | 455/556.1 |
| 2004/0235430 A1 * | 11/2004 | Ma et al. | 455/90.1 |
| 2005/0136988 A1 * | 6/2005 | Villamil et al. | 455/567 |
| 2009/0112713 A1 * | 4/2009 | Jung et al. | 705/14 |
| 2011/0139810 A1 * | 6/2011 | Lee | 222/1 |

OTHER PUBLICATIONS

Harris, Tom. "How Aerosol Cans Work" Nov. 8, 2001. HowStuffWorks.com. <http://www.howstuffworks.com/innovation/everyday-innovations/aerosol-can.htm> downloaded Dec. 6, 2011.*

* cited by examiner

*Primary Examiner* — Dwayne Bost
*Assistant Examiner* — Larry Sternbane
(74) *Attorney, Agent, or Firm* — Gulf Coast Intellectual Property Group

(57) ABSTRACT

A scent notification system operably coupled to a conventional cellular phone wherein the scent notification system is configured to alert the cellular phone user to an incoming communication via dispersal of a fluid having a specific aromatic property. The scent notification system further includes a housing that is operably coupled to the cellular phone. The housing has an interior volume that has contained therein at least one cartridge containing a fluid and an expansion chamber operably coupled thereto. The cartridge further includes a propellant to propel the fluid from the cartridge to the expansion chamber where the fluid converts to a gaseous phase and then propagates out of the expansion chamber via a nozzle.

16 Claims, 2 Drawing Sheets

SCENT NOTIFICATION SYSTEM FOR A PORTABLE COMMUNICATION DEVICE

FIELD OF THE INVENTION

The present invention relates to an alternative notification system for a communication device, more specifically but not by way of limitation, a scent dispersal system operably coupled to a cellular phone in order to provide a alternative method of notification for a received call or text message or email.

BACKGROUND

Millions of individuals utilize portable communication devices routinely on a daily basis. Devices such as two-way radios, cellular phones and other portable communication devices have become necessities for individuals to communicate in a timely manner when needed. A conventional cellular phone processes and receives at least three types of communications. The cellular phone is capable of making and receiving a phone call, receive and/or send a SMS text message as well as receive and/or send an email.

Upon receipt of any of the types of communications referenced above, the cellular phone functions to notify the user of the receipt of the communication. Conventional notification techniques utilize audio sounds such as ring tones, beeps or other sounds to alert the user to an incoming phone call, text message or email. Additionally, conventional cellular phones can also be programmed to alert the user to an incoming phone call, text message or email utilizing a short duration or sequence of vibrations.

One problem with the audio notification is that many times the user may be unable to hear the ring tone or beep due to proximate environmental conditions. Loud noises and environments such as outdoor areas routinely have substantial background noise, which substantially limits the user's ability to hear an audio notification that they have received a phone call, text or email. Additionally, for those cellular phone users that are hearing impaired and utilize their cellular phone for text messaging or email are unable to utilize the conventional audio notification sounds generated by the cellular phone.

Another issue with the conventional notification system is the vibration notification. Many users may have placed the cellular phone in an area that substantially mutes the vibration noise and/or feel. Additionally many users may be engaged in an activity or in a position wherein they are subject to environmental vibrations such as but not limited to riding a bicycle or in a car.

Accordingly, there is a need to provide a cellular phone that provides an alternative method of notification to the user of an incoming phone call, text message or email that can be detected when the user is present in an environment that is not conducive to conventional notification techniques.

SUMMARY OF THE INVENTION

It is the object of the present invention to provide an alternative notification device to the user of a cellular phone so as to notify the user of the cellular phone upon receiving a phone call, text message or email.

A further object of the present invention is to provide an alternative notification method for a cellular phone that utilizes at least one scented compound wherein the scented compound is dispersed upon receipt of a phone call, email or text message.

Another object of the present invention is to provide scent notification to a user of a cellular phone that provides the user an ability to utilize hundreds of scent compounds.

Yet another object of the present invention is to provide a scent notification to a user of a cellular phone that is enclosed in a replacement back cover wherein the replacement back cover can be releasably secured to a conventional cellular phone housing.

Still another object of the present invention is to provide a scent notification system operably couplable to a plurality of different types of conventional cellular phones.

A further object of the present invention is to provide a scent notification system that is operably coupled to the power source of the cellular phone.

Another object of the present invention is to provide a scent notification system that is operably coupled to a cellular phone that is easy to use and utilizes replaceable scent cartridges.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawing wherein:

DETAILED DESCRIPTION

Figure 1:
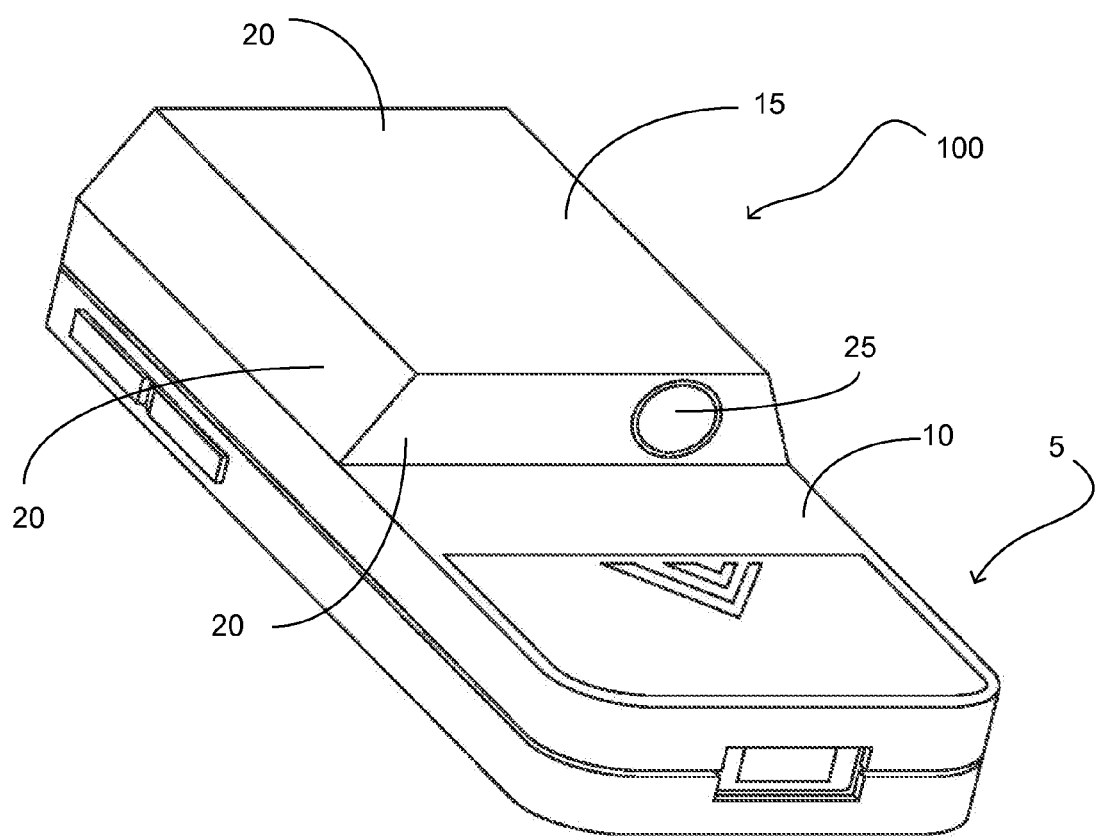
FIG. 1 is a perspective view of a cellular phone having a back cover that includes a scent notification system.

Referring now to the drawing submitted herewith wherein the various elements depicted therein are not necessarily drawn to scale and in particular FIG. 1, there is illustrated an embodiment of a cellular phone having a scent notification system 100 constructed according to the principles of the present invention.

The scent notification system 100 is integrally formed with a conventional cellular phone 5. The cellular phone 5 includes a housing 10 that is generally rectangular in shape and is manufactured from a suitable durable material such as but not limited to plastic. While the housing 10 is illustrated herein as being generally rectangular in shape, those skilled in the art will recognize that the housing 10 could be manufactured in numerous different shapes.

The scent notification system 100 further includes a cover 15 that is releasably secured to the housing 10 of the cellular phone 5. The cover 15 is releasably secured to the housing 10 utilizing suitable conventional methods such as mating receptacles or other known mechanical coupling devices. The cover 15 is manufactured from a suitable durable material such as but not limited to plastic. The cover 15 is generally rectangular in shape and further includes a plurality of walls 20 integrally formed with each other so as to create an interior volume. Those skilled in the art should recognize that the cover 15 could be manufactured from numerous different amounts of walls 20 in order to create a desired shape having an interior volume.

The cover 15 further includes an aperture 25 integrally formed into one of the walls 20. The aperture 25 is generally annular in shape and functions to allow a user to insert a cartridge 50 into the interior volume 40 of the cover 15. Those skilled in the art will recognize that the aperture 25 could be shaped in numerous different shapes in order to receive therein a cartridge 50 of a mateable shape.

Figure 2:
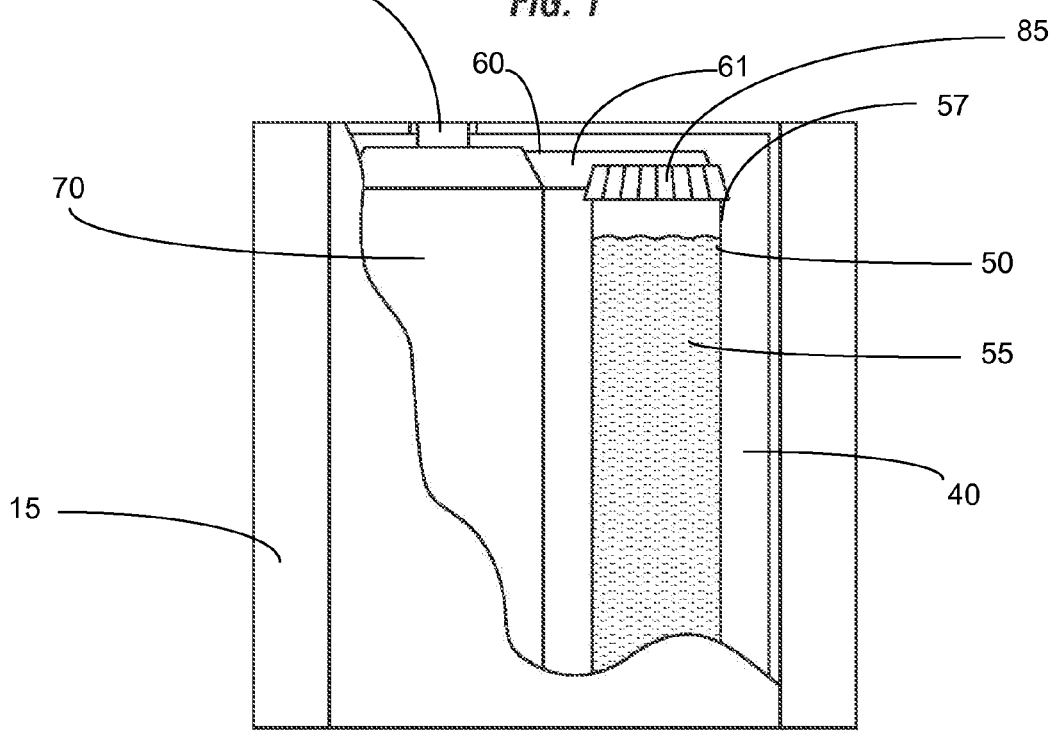
FIG. 2 is an internal view of the back cover of FIG. 1 illustrating the components of the scent dispersal system.
Figure 3:
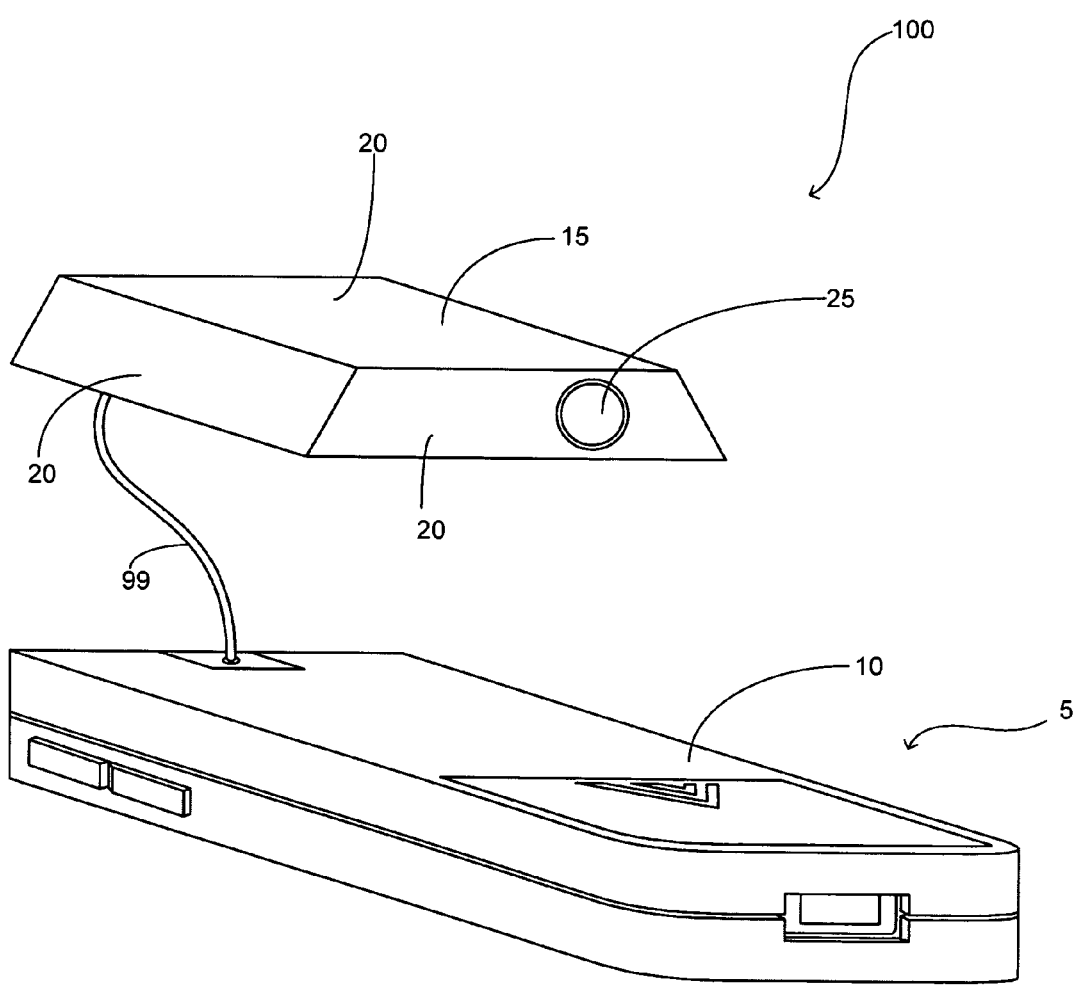
FIG. 3 is a perspective view of the scent notification system decoupled from the cellular phone.

Referring in particular to FIG. 2, the interior volume 40 of the cover 15 is illustrated. Disposed within the interior volume 40 of the cover 15 is a cartridge 50. The cartridge 50 is generally cylindrical in shape and has contained therein a fluid 55. It should be recognized that is contemplated within the scope of the present invention that the cartridge 50 could be manufactured in numerous different shapes. The fluid 55 is a liquid compound that has a specific aromatic property. More specifically but not by way of limitation, the fluid has an aromatic property of at least one of the following aromas: bubble gum, lavender, sour apple, cinnamon, cologne, wet dog, spicy aroma, pizza, flatulence, soda pop, French fries, spring rain, evergreen trees, grass, pink, roses, chanel No. 5, graham webb, aveda, angel, Charlie blue, light blue, elene, fendi, escada sentiment, green tea, redken, Giorgio Armani, blue, brut, axe, mustang, tim mcgraw, eternity, calvin klein, Stetson, Francesco small, realm, cool water, orange, stinky feet, beer, vodka, fish, garbage, cigarette, vomit, dog urine, cat urine, yellow, hamburger, fried chicken, nacho cheese, apple pie, chocolate cookies, blueberry pancakes, peanut butter, green, incense, watermelon, flowing river, blackberry, strawberry, raspberry, pineapple. The fluid while contained within the cartridge 50 is pressurized utilizing conventional techniques. The cartridge 50 additionally contains therein a propellant in order to assist in the dispersal of the fluid 55 from the cartridge 50. Those skilled in the art will recognize that numerous different propellants could be utilized in the cartridge 50. More specifically but not by way of limitation, the cartridge 50 could utilize compressed gas, chlorofluorocarbons, LPG, or dimethyl ether as a propellant to assist in the dispersal of the fluid 55. The propellant is stored under high pressure and functions to propel the fluid 55 disposed within the cartridge 50 out through the channel 60 and into the expansion chamber 70 and subsequently propagating out the nozzle 80. Although no specific size of the cartridge 50 is required, good results have been achieved by utilizing a cartridge 50 that is manufactured to hold approximately between one to 3 ounces of fluid 55.

The channel 60 operably couples to the top 57 of the cartridge and is generally hollow and tubular in shape having an internal passage 61 for allowing the passage of the fluid 55 therethrough. Intermediate to the channel 60 and the top 57 is a trigger cap 85. The trigger cap 85 has a first position in which it is substantially closed thereby permitting the retaining of the fluid 55 within the cartridge 50. In its second position, the trigger cap 85 is substantially open for a discrete time period allowing at least a portion of the fluid 55 disposed within the cartridge 50 to escape via the channel 60 with the fluid 55 being propelled out of the cartridge 50 utilizing the propellant referenced herein. The fluid 55 contained within the cartridge 50 has a boiling point at or below that of room temperature. As the fluid 55 exits the cartridge 50 and passes through the channel 60 it passes into the expansion chamber 70, which is at atmospheric pressure. Subsequent to reaching the expansion chamber 70, the fluid 55 is transformed into a gaseous form and exits the expansion chamber via the nozzle 80. While no particular amount of fluid 55 is required to be released from the cartridge 50, it is contemplated within the scope of the present invention that the amount of fluid 55 dispersed from the cartridge 50 has a greater volume when in gaseous form than that of the volume of the expansion chamber 70.

The expansion chamber 70 is disposed within the interior volume of the cover 15 and is hollow and generally cylindrical in shape. The expansion chamber 70 is manufactured from a suitable, durable, inert material such as metal or plastic. The expansion chamber 70 functions to receive the fluid 55 from the cartridge 50 and allow the fluid 55 to boil and change to a gaseous state. Those skilled in the art will recognize that the expansion chamber 70 could be manufactured in numerous different shapes and sizes and still achieve the desired function as described herein.

Illustrated in the drawings submitted herewith, the scent notification system 100 is electrically coupled to the conventional power source of a cellular phone 5 utilizing an electrical wire 99. The power source provides the power needed to operate the scent notification system 100. Upon being operably coupled to the cellular phone 5, the software of the cellular phone 5 is upgraded to include the option of the scent notification system 100 as a selectable notification method upon receipt of a phone call, text message or email. Once programmed, subsequent receipt of either a phone call, text message or email, the software will send a signal to the power source to generate sufficient voltage to activate the trigger cap 85 to its second position thereby permitting the escape of a discrete amount of fluid 55 into the expansion chamber 70. The fluid 55 enters the expansion chamber 70 and boils into a gaseous form and escapes via the nozzle 80 whereby the user detects the presence of the aroma of the gas 55 and either answers the phone call and/or reads the received text message or email.

While not illustrated in the drawings submitted herewith, it is further contemplated within the scope of the present invention that the cartridge 50 could be configured to further include the elements of the expansion chamber 70. More specifically but not by way of limitation, it is contemplated within the scope of the present invention that the cartridge 50 could have one portion that retains the scented fluid and a second portion that is configured to be hollow with a element similar to the trigger cap 85 intermediate to the first and second portions. In this embodiment, the fluid 55 would pass to the second portion wherein the fluid 55 would boil and change into a gaseous phase. The cartridge would be operably connected to the nozzle 80 permitting the gas to escape and provide notification to the user of an incoming communication.

A description of the operation of the scent notification system 100 is as follows. In use, a user will mechanically couple the cover 15 to the housing 10 of a conventional cellular phone 5. The user will then select a desired cartridge 50 having contained therein a fluid 55 that has a specific aromatic property. The cartridge 55 is inserted into the cover 15 via the aperture 25. The software integrated into the conventional cellular phone 5 is programmed to activate the scent notification system 100 as an option to alert the user of the cellular phone to an incoming phone call, text message and/or email. Subsequent to receipt of any of the aforementioned communication types, the software of the phone sends a signal to the power source of the phone to distribute a voltage signal to the trigger cap 85 of the scent notification system 100. Upon receipt of the voltage signal, the trigger cap 85 moves to its second position thereby allowing the passage of a discrete amount of fluid 55 into the channel 60 and the expansion chamber 70. The fluid 55 having been expelled by the propellant is now at atmospheric pressure and boils into a gaseous state wherein the volume of the gas is greater than the volume of the expansion chamber 70. Having exceeded the volume of the expansion chamber 70, the gas escapes via the nozzle 80 whereby the aromatic properties of the gas are detectable by an individual proximate the cellular phone 5 alerting that individual that a phone call, text message or email has been received.

In the preceding detailed description, reference has been made to the accompanying drawing that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A scent notification system comprising:
   a housing, said housing having at least one wall and configured to have a internal volume, said housing operable to mechanically couple to a portable communication device;
   a cartridge, said cartridge operable to receive and store a mixture, said cartridge configured to be releasably secured within the internal volume of said housing; and said mixture having at least one specific aromatic property; and
   a propellant, said propellant disposed within said cartridge, said propellant for assisting in the dispersal of said mixture.

2. The system as recited in claim 1, wherein said housing further includes an expansion chamber, said expansion chamber being at atmospheric pressure, said expansion chamber for receiving said mixture from said cartridge.

3. The system as recited in claim 2, wherein said system releases a discrete amount of fluid from said cartridge into said expansion chamber when the portable communication device receives a communication signal.

4. The system as recited in claim 3, and further including a nozzle, said nozzle integrated into said expansion chamber, said nozzle for facilitating the release of said mixture from said expansion chamber subsequent to said mixture transforming into a gaseous phase.

5. The system as recited in claim 4, wherein said system releases a discrete amount of mixture from said cartridge when at least one of the following communication types is received by the portable communication device: a phone call, email message or SMS message.

6. A scent notification system for a cellular phone comprising:
   a housing, said housing being generally rectangular in shape and being configured to have an interior volume, said housing further configured to mechanically couple to the back of a conventional cellular phone; and
   a cartridge, said cartridge being generally cylindrical in shape and being configured to receive and store a fluid, said cartridge configured to be releasably secured within the interior volume of said housing; and
   an expansion chamber, said expansion chamber being disposed within the interior volume of said housing, said expansion chamber being operably coupled to said cartridge, said expansion chamber configured to receive a discrete amount of fluid from said cartridge; and
   wherein said fluid is dispersed from said cartridge into said expansion chamber when the cellular phone receives an incoming communication.

7. The scent notification system as recited in claim 6, and further including a nozzle, said nozzle operably coupled to said expansion chamber, said nozzle for facilitating the release of said fluid subsequent to the fluid's entry into said expansion chamber wherein said fluid has transformed into a gaseous phase.

8. The scent notification system as recited in claim 7, wherein said cartridge further includes a propellant, said propellant disposed within said cartridge, said propellant for assisting in the dispersal of said fluid.

9. The scent notification system as recited in claim 8, wherein the interior volume of said expansion chamber is less than the gaseous volume of the discrete amount of fluid that was dispersed into said expansion chamber.

10. The scent notification system as recited in claim 9, wherein said scent notification system releases a discrete amount of mixture from said cartridge when at least one of the following communication types is received by the cellular phone: a phone call, email message or SMS message.

11. A scent notification system operably coupled to a cellular phone wherein the scent notification system is operable to provide an aroma of a particular property subsequent to the cellular phone receiving a communication comprising:
    a housing, said housing being generally rectangular in shape and being configured to have an interior volume, said housing being manufactured from plastic, said housing further including an aperture, said aperture being generally cylindrical in shape, said housing further configured to mechanically couple to the back of a conventional cellular phone; and
    a cartridge, said cartridge being generally cylindrical in shape and being configured to receive and store a fluid, said cartridge configured to be releasably secured within the interior volume of said housing, said cartridge configured to be journaled through said aperture; and
    an expansion chamber, said expansion chamber being disposed within the interior volume of said housing, said expansion chamber being operably coupled to said cartridge, said expansion chamber configured to receive a discrete amount of fluid from said cartridge; and
    a nozzle, said nozzle being operably coupled to said expansion chamber, said nozzle for directing the dispersal of the gaseous phase of said fluid subsequent to said fluid entering said expansion chamber; and
    wherein said fluid disposed within said cartridge has a boiling point well below room temperature.

12. The scent notification system as recited in claim 11, wherein said expansion chamber is at atmospheric pressure, and said expansion chamber functions to provide an area for the fluid to transform from a liquid phase having a first volume into a gas phase having a second volume.

13. The scent notification system as recited in claim 12, wherein the interior volume of said expansion chamber is less than that of said second volume.

14. The scent notification system as recited in claim 13, wherein said cartridge further includes a propellant, said propellant disposed within said cartridge, said propellant for assisting in the dispersal of said fluid.

15. The scent notification system as recited in claim 14, wherein said system is operably coupled to the battery power source of the cellular phone.

16. The scent notification system as recited in claim 15, wherein said scent notification system releases a discrete amount of mixture from said cartridge when at least one of the following communication types is received by the cellular phone: a phone call, email message or SMS message.

* * * * *